United States Patent
Tang et al.

(10) Patent No.: US 10,033,933 B2
(45) Date of Patent: Jul. 24, 2018

(54) METHOD FOR CONTROLLING SURVEILLANCE SYSTEM WITH AID OF AUTOMATICALLY GENERATED PATROL ROUTES, AND ASSOCIATED APPARATUS

(71) Applicant: Synology Incorporated, Taipei (TW)

(72) Inventors: Tao-Yen Tang, Taipei (TW); Hsiao-Han Chen, Pingtung County (TW); Szu-Hsien Lee, Taipei (TW)

(73) Assignee: Synology Incorporated, Taipei (TW)

( * ) Notice: Subject to any disclaimer, the term of this patent is extended or adjusted under 35 U.S.C. 154(b) by 283 days.

(21) Appl. No.: 14/937,839

(22) Filed: Nov. 10, 2015

(65) Prior Publication Data

US 2016/0301877 A1 Oct. 13, 2016

(30) Foreign Application Priority Data

Apr. 7, 2015 (TW) .............................. 104111144 A

(51) Int. Cl.
*H04N 5/232* (2006.01)
*H04N 7/18* (2006.01)
(Continued)

(52) U.S. Cl.
CPC ... *H04N 5/23296* (2013.01); *G08B 13/19641* (2013.01); *H04N 5/232* (2013.01);
(Continued)

(58) Field of Classification Search
CPC .... H04N 5/23296; H04N 7/188; H04N 7/181; H04N 5/232; H04N 5/247; G08B 13/19641
(Continued)

(56) References Cited

U.S. PATENT DOCUMENTS 6,680,746 B2 1/2004 Kawai
2005/0071046 A1 3/2005 Miyazaki
(Continued)

FOREIGN PATENT DOCUMENTS

| TW | 543323 | 7/2003 |
|---|---|---|
| TW | 201121330 A1 | 6/2011 |
| TW | 201415882 A | 4/2014 |
| WO | 2004038659 A2 | 5/2004 |

OTHER PUBLICATIONS

Synology Europe, Synology—Webinar DSM 5.1 (deutsch)—Grundlagen Surveillance Station 7.0, Feb. 13, 2015, XP054976757, URL:http://www.youtube.com/watch?v=z3vRhyCTvpE.

*Primary Examiner* — Andy Rao
*Assistant Examiner* — Zaihan Jiang
(74) *Attorney, Agent, or Firm* — Winston Hsu

(57) ABSTRACT

A method for controlling a surveillance system includes a plurality of cameras equipped with capability of capturing direction adjustment. The method includes the steps of: calculating monitoring regions of the plurality of cameras according to coordinates of the plurality of cameras, respectively, to generate space information of the monitoring regions, wherein any monitoring region of the monitoring regions includes a union of a plurality of regions monitored by a corresponding camera of the plurality of cameras through capturing direction adjustment; automatically generating target patrol routes of the plurality of cameras according to the monitoring regions and according to a plurality of target points; and applying configurations corresponding to the target patrol routes to the plurality of cameras, respectively, to cause capturing direction adjustment operations of the plurality of cameras to correspond to the target patrol routes, respectively.

20 Claims, 8 Drawing Sheets

Generate patrol routes

(51) Int. Cl.
*G08B 13/196* (2006.01)
*H04N 5/247* (2006.01)
(52) U.S. Cl.
CPC ............. *H04N 5/247* (2013.01); *H04N 7/181* (2013.01); *H04N 7/188* (2013.01)
(58) Field of Classification Search
USPC ........................................................ 348/159
See application file for complete search history.

(56) References Cited

U.S. PATENT DOCUMENTS

| | | | | |
|---|---|---|---|---|
| 2005/0078184 | A1* | 4/2005 | Sakai | ............... G08B 13/19643 348/143 |
| 2005/0206726 | A1* | 9/2005 | Yoshida | ................. H04N 7/181 348/143 |
| 2006/0256195 | A1* | 11/2006 | Ogawa | ................... H04N 7/185 348/143 |
| 2007/0115358 | A1 | 5/2007 | McCormack | |
| 2008/0211916 | A1* | 9/2008 | Ono | ................. G08B 13/19608 348/164 |
| 2008/0225121 | A1* | 9/2008 | Yoshida | ........... G08B 13/19641 348/159 |
| 2010/0321473 | A1* | 12/2010 | An | ........................ H04N 5/2628 348/47 |
| 2011/0267471 | A1* | 11/2011 | Lee | ........................ H04N 7/181 348/159 |
| 2015/0187088 | A1* | 7/2015 | Iwai | ...................... G06T 11/206 345/634 |

* cited by examiner

METHOD FOR CONTROLLING SURVEILLANCE SYSTEM WITH AID OF AUTOMATICALLY GENERATED PATROL ROUTES, AND ASSOCIATED APPARATUS

BACKGROUND OF THE INVENTION

1. Field of the Invention

The present invention relates to the setting cameras of which are equipped with capturing direction adjustment capability, and more particularly, to a method and apparatus for controlling a surveillance system.

2. Description of the Prior Art

According to related arts, when a user is operating a conventional digital surveillance system, some issues may be encountered. For example, when the user wants to modify configurations of a camera (e.g. a pan-tilt-zoom (PTZ) Camera), the setting operations may be limited by a conventional control scheme, meaning the entire setting flow is unable to be completed quickly. In another example, when a camera in the conventional digital surveillance system is destroyed by a thief, the camera will stop patrol operations; therefore, the conventional digital surveillance system cannot utilize the PTZ camera to perform monitoring operations. In another example, since conventional patrol routes can only be set for one single camera in the conventional digital surveillance system, when a camera (e.g. a PTZ camera) in the conventional digital surveillance system is in an offline state, the conventional digital surveillance system cannot obtain video data of the PTZ camera, and cannot monitor the area in the conventional patrol route of the PTZ camera. Note that, in the above two examples, even though the recording operations of the conventional digital surveillance system can continue, the recorded data corresponding to the PTZ camera will not include any meaningful content.

In view of the above, related art techniques cannot properly serve the user. Hence, there is a need for a novel method to improve the control of the digital surveillance system.

SUMMARY OF THE INVENTION

An objective of the present invention is to provide a method for controlling a surveillance system and an associated apparatus to solve the aforementioned problem.

Another objective of the present invention is to provide a method for controlling a surveillance system and an associated apparatus that can assist a user to quickly and properly set cameras equipped with capturing direction adjustment capability, such as pan-tilt-zoom (PTZ) cameras, to thus improve the user experience.

Another objective of the present invention is to provide a method for controlling a surveillance system and an associated apparatus that can automatically reallocate patrol routes of each set of cameras when a camera (such as a PTZ camera) within the set of cameras is in an offline state, to therefore reduce a monitoring blank period caused by a disconnection.

At least one preferred embodiment of the present invention provides a method for controlling a surveillance system. The surveillance system includes a plurality of cameras equipped with capturing direction adjustment capability. The method is applied to a control circuit of the surveillance system. The method includes: calculating monitoring regions of the plurality of cameras according to coordinates of the plurality of cameras, respectively, to generate space information of the monitoring regions, wherein any monitoring region of the monitoring regions comprises a union of a plurality of regions monitored by a corresponding camera within the plurality of cameras through capturing direction adjustment; automatically generating target patrol routes of the plurality of cameras according to the monitoring regions and according to a plurality of target points; and applying configurations corresponding to the target patrol routes to the plurality of cameras, respectively, to make capturing direction adjustment operations of the plurality of cameras correspond to the target patrol routes, respectively.

In addition to the above method, the present invention also provides an apparatus for controlling a surveillance system. The surveillance system includes a plurality of cameras equipped with capturing direction adjustment capability. The apparatus includes at least a portion of the surveillance system, an interface circuit and a control circuit. The interface circuit is configured in a central control device of the surveillance system, and coupled to the plurality of cameras. The control circuit is coupled to the interface circuit and configured in the central control device, wherein the control device is arranged to: calculate monitoring regions of the plurality of cameras according to coordinates of the plurality of cameras, respectively, to generate space information of the monitoring regions, wherein any monitoring region of the monitoring regions comprises a union of a plurality of regions monitored by a corresponding camera of the plurality of cameras through capturing direction adjustment; automatically generate target patrol routes of the plurality of cameras according to the monitoring regions and according to a plurality of target points; and apply configurations corresponding to the target patrol routes to the plurality of cameras, respectively, to make capturing direction adjustment operations of the plurality of cameras correspond to the target patrol routes, respectively.

An advantage provided by the present invention is that, compared with related art techniques, the method and apparatus of the present invention may assist the user to quickly and properly set the cameras (e.g. PTZ cameras), thus saving time for the user and improving the user experience. More particularly, the method and apparatus of the present invention may automatically calculate the monitoring regions of the plurality of cameras, and may automatically generate the target patrol routes, accordingly. Hence, the user need not spend time deciding which object target area should be assigned to a specific camera for patrolling and monitoring. The method and apparatus of the present invention may automatically generate the target patrol routes to automatically decide newest configurations of the cameras, allowing the user to complete the entire setting flow quickly. Further, the method and apparatus of the present invention may set a camera patrol group in the surveillance system, and automatically allocate patrol routes of each camera within the camera patrol group. When any camera in the camera patrol group is in a disconnected state, the method and apparatus of the present invention may automatically reallocate the patrol routes of each camera in the camera patrol group which is still operable, in order to reduce the monitoring blank period caused by a disconnection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
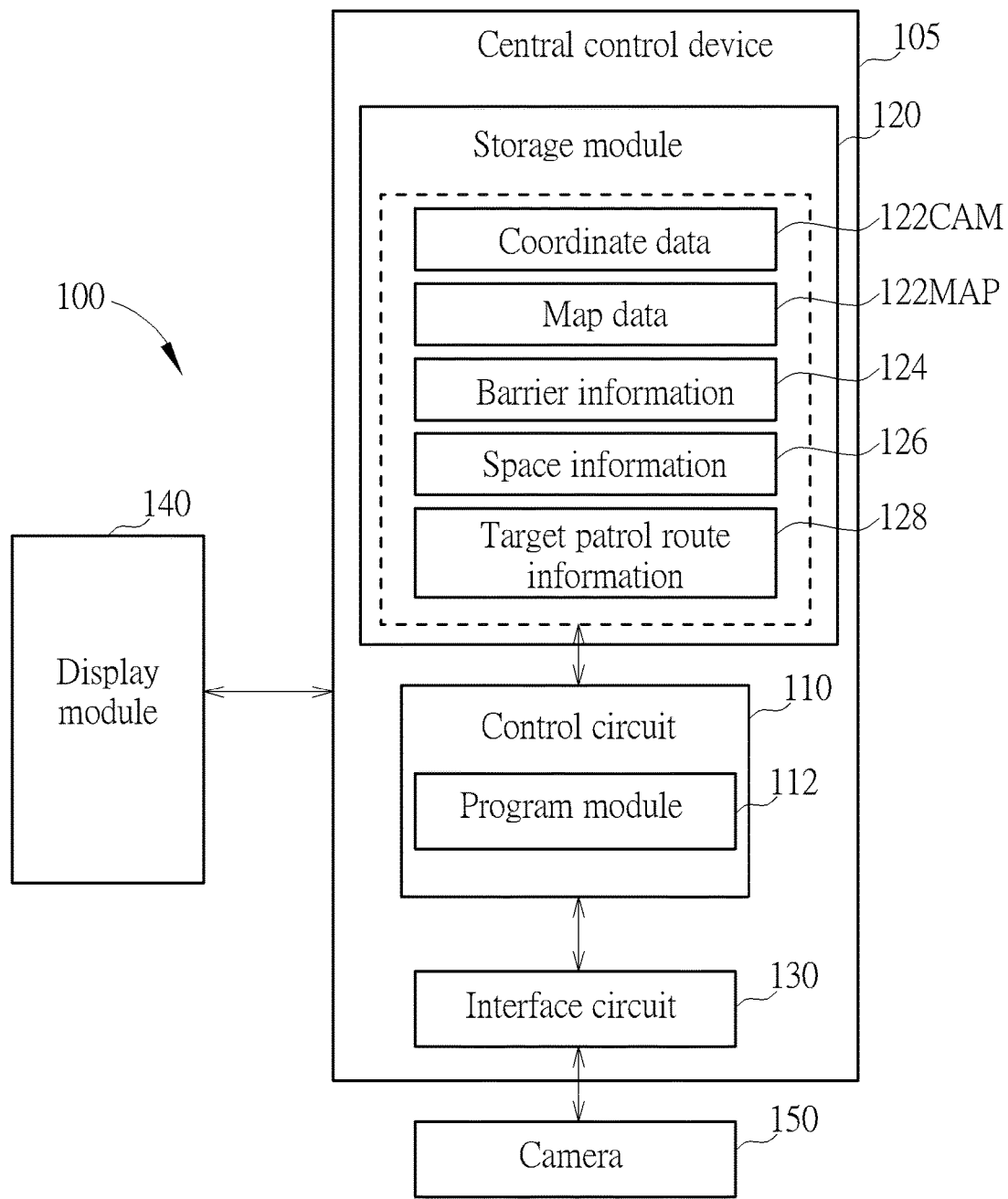
FIG. 1 is a diagram illustrating an apparatus for controlling a surveillance system according to an embodiment of the present invention.

FIG. 1 is a diagram illustrating an apparatus 100 for controlling a surveillance system according to an embodiment of the present invention, wherein the surveillance system comprises a plurality of cameras equipped with capturing direction adjustment capability, such as a plurality of pan-tilt-zoom (PTZ) cameras. The apparatus 100 may comprise at least a portion (e.g. part or all) of the surveillance system.

The camera 150 shown in FIG. 1 may represent the plurality of cameras, such as a plurality of panning, tilting and zooming (PTZ) cameras. According to this embodiment, each of the plurality of PTZ cameras may store one or more indicated configurations, and may automatically perform any of panning, tilting and zooming operations, or perform a combination of these operations according to the indicated configurations. The indicated configurations may be updated, making the capturing direction adjustment operations and/or zooming operations of the PTZ camera change correspondingly. For example, when the apparatus 100 applies a plurality of predetermined configurations to the plurality of cameras, respectively, the plurality of cameras may automatically perform any of panning, tilting and zooming operations, or perform a combination of panning, tilting and zooming operations according to the plurality of predetermined configurations.

As shown in FIG. 1, the apparatus 100 comprises a central control device 105. The central control device 105 comprises a control circuit 110, a storage module 120 and an interface circuit 130. The control circuit 110 in this embodiment may comprise one or more program modules for controlling operations of the apparatus 100, wherein the program module 112 shown in FIG. 1 may represent the one or more program modules. For example, the aforementioned one or more program modules may be a firmware module. This is merely for illustrative purposes, and not meant to be a limitation of the present invention. In another example, the aforementioned one or more program modules may be a software module. In yet another example, the aforementioned one or more program modules may be implemented as an inner module of a customized integrated circuit (IC).

In practice, the control circuit 110 may be implemented with a micro control unit (MCU) or a microcontroller. Further, the storage module 120 in this embodiment may be used to store the coordinate data 122CAM of the plurality of cameras, the map data 122MAP, the barrier information 124, the space information 126 of respective viewable ranges of the plurality of cameras (i.e. the ranges which can be captured through performing capturing direction adjustment), and the target patrol route information 128 of the plurality of cameras. The storage module 120 may be configured from the control circuit 110, wherein the control circuit 110 is coupled to the interface circuit 130, and the storage module 120 is coupled to the control circuit 110. According to some embodiments, the storage module 120 may be integrated in the control circuit 110.

According to this embodiment, the interface circuit 130 is coupled to the plurality of cameras (e.g. the camera 150 shown in FIG. 1). Further, the control circuit 110 may generate the barrier information 124, the space information 126 and the target patrol route information 128, and may update the barrier information 124, the space information 126 and the target patrol route information 128, wherein the barrier information 124 may comprise information related to at least one barrier.

Figure 2:
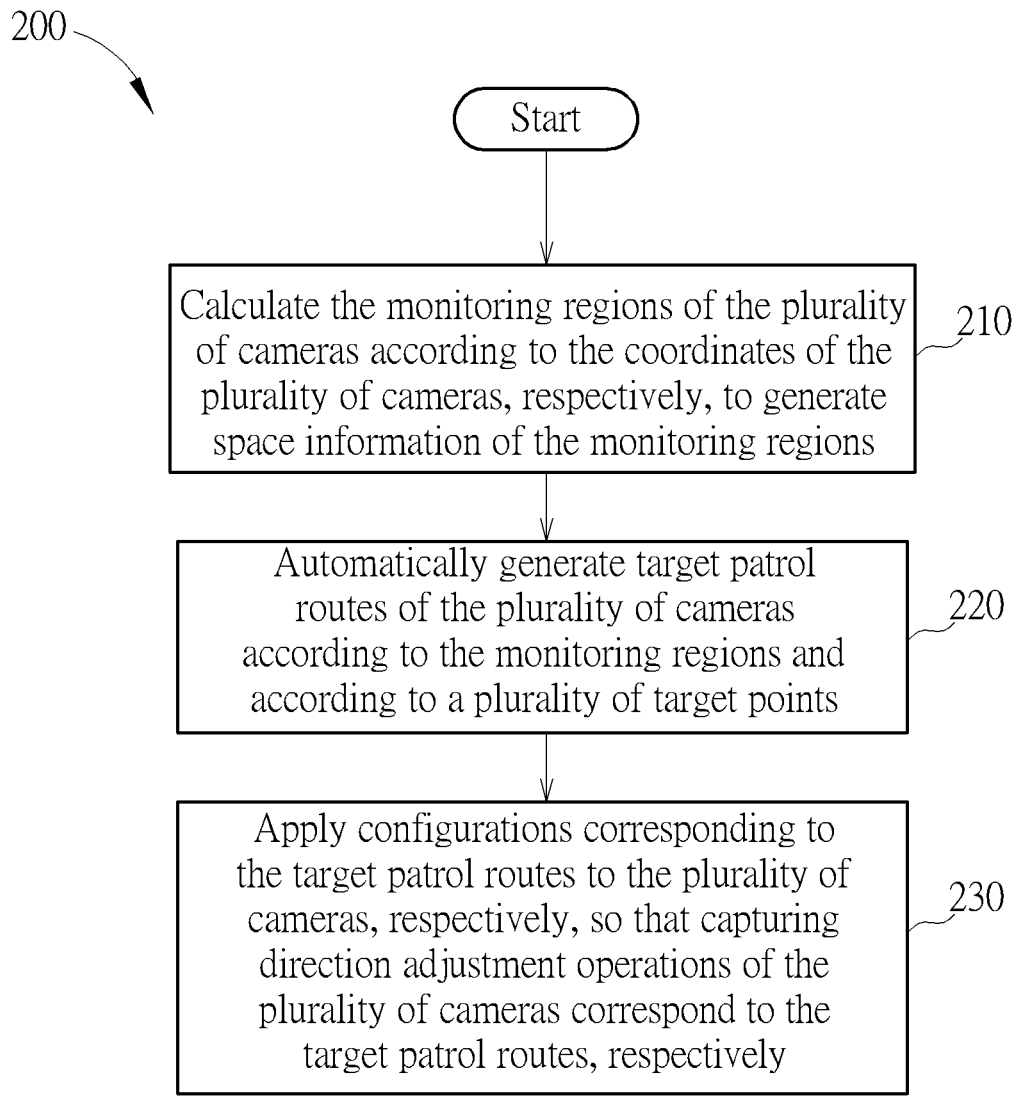
FIG. 2 is a flowchart illustrating a method for controlling a surveillance system according to an embodiment of the present invention.

FIG. 2 is a flowchart illustrating a method 200 for controlling a surveillance system according to an embodiment of the present invention. The method 200 may be applied to the apparatus 100 shown in FIG. 1, and may also be applied to the aforementioned central control device 105, and more particularly, applied to the control circuit 110 in the central control device 105. For example, the control circuit 110 may obtain or generate the coordinate data 122CAM and the map data 122MAP before performing the operation in Step 210. This is merely for illustrative purposes, and not meant to be a limitation of the present invention. The method is described as follows:

In Step 210, the control circuit 110 calculates the monitoring regions of the plurality of cameras according to the coordinates of the plurality of cameras, respectively, to generate space information of the monitoring regions, wherein any monitoring region of the monitoring regions comprises a union of a plurality of regions monitored by a corresponding camera within the plurality of cameras through capturing direction adjustment. For example, the control circuit 110 may calculate the monitoring regions of the plurality of cameras according to the coordinates of the plurality of cameras and a rotation ability parameter of the camera within the plurality of cameras, respectively, in order to generate the space information of the monitoring regions, More particularly, the monitoring regions may comprise the monitoring region corresponding to the aforementioned camera, wherein the monitoring region corresponds to rotation ability parameters of the camera.

In Step 220, the control circuit 110 automatically generates target patrol routes of the plurality of cameras according to the monitoring regions and according to a plurality of target points. In this embodiment, the control circuit 110 may determine whether the corresponding camera is equipped with capability to capture the specific target point according to the space information of the monitoring region (i.e., "any monitoring region" mentioned in Step 210) within the monitoring regions and according to the coordinate of a specific target point within the plurality of target points, in order to decide a target patrol route of the corresponding camera. For example, when the control circuit 110 determines that the corresponding camera has this capability, the control circuit 110 may utilize the corresponding camera to monitor the specific target point, wherein the specific target point locates on the target patrol route of the corresponding camera. In another example, when the control circuit 110 determines that the corresponding camera is not equipped with this capability, the control circuit 110 may utilize another camera within the plurality of cameras to monitor the specific target point, wherein the specific target point does not locate on the target patrol route of the corresponding camera.

In Step 230, the control circuit 110 may utilize the interface circuit 130 to apply configurations corresponding to the target patrol routes to the plurality of cameras, respectively, so that capturing direction adjustment operations of the plurality of cameras correspond to the target patrol routes, respectively. For example, the control circuit 110 may utilize the interface circuit 130 to apply the plurality of predetermined configurations in the embodiment of FIG. 1 to the plurality of cameras, so that the plurality of cameras automatically perform patrol operations (e.g. capturing direction adjustment operations) for obtaining images corresponding to the target patrol routes, respectively.

For better understanding, the coordinate data 122CAM shown in FIG. 1 may be an example of the coordinates of the plurality of cameras in this embodiment, the space information 126 shown in FIG. 1 may be an example of the space information of the monitoring regions in this embodiment, and the target patrol route information 128 shown in FIG. 1 may be an example of the target patrol routes in this embodiment. According to some embodiments, when automatically generating the target patrol routes of the plurality of cameras, the control circuit 110 may control a target point amount monitored by the corresponding camera for preventing the target point amount monitored by the corresponding camera from exceeding a predetermined upper bound value. For example, when automatically generating the target patrol routes of the plurality of cameras, the control circuit 110 may accumulate the target point amount monitored by the corresponding camera. Further, when the target point amount monitored by the corresponding camera reaches the predetermined upper bound value, the control circuit 110 may prevent a target patrol route of the corresponding camera from including any other target point, so that the target point amount monitored by the corresponding camera does not exceed the predetermined upper bound value.

According to some embodiments, when automatically generating the target patrol routes of the plurality of cameras, the control circuit 110 may calculate a score of the specific target point with respect to the corresponding camera according to a predetermined function. Further, the control circuit 110 may refer to the score of the specific target point with respect to the corresponding camera to decide whether to utilize the corresponding camera to monitor the specific target point. For example, under the control of the control circuit 110, the probability that the surveillance system utilizes the corresponding camera to monitor the specific target point depends on the value of the score. In another example, a plurality of parameters of the predetermined function may comprise a target point count parameter, and the target point count parameter may represent an accumulated amount of the target point monitored by the corresponding camera. In another example, a plurality of parameters of the predetermined function may comprise a distance parameter, and the distance parameter may represent a distance between the corresponding camera and the specific target point distance.

According to some embodiments, the plurality of parameters of the predetermined function may comprise the target point count parameter and the distance parameter. Further, the predetermined function may comprise the at least one weighting factor, such as one or more weighting factors. The aforementioned weighting factor may be used to adjust the influence of the distance parameter and/or the target point count parameter on the score. For example, under the control of the control circuit 110, the surveillance system may provide a user interface for allowing a user of the surveillance system to set the weighting factor in order to adjust the influence of the distance and/or the accumulated amount on the score.

According to some embodiments, when automatically generating the target patrol routes of the plurality of cameras, the control circuit 110 may refer to the predetermined function to calculate a score of the specific target point with respect to another camera within the plurality of cameras. Further, the control circuit 110 may compare the score of the specific target point with respect to the corresponding camera with the score of the specific target point with respect to the other camera, to decide whether to utilize the corresponding camera to monitor the specific target point.

According to some embodiments, a plurality of parameters of the predetermined function may comprise an overruling parameter. Further, the control circuit 110 may determine whether the corresponding camera is equipped with capability to capture the specific target point according to the space information of the monitoring region within the monitoring regions and according to the coordinate of the specific target point. When the control circuit 110 determines that the corresponding camera is not equipped with this capability, the control circuit 110 may set the overruling parameter to be zero to enforce the score to be zero. In this way, the specific target point will not locate on the target patrol route of the corresponding camera.

According to some embodiments, when it is detected that a specific camera within the plurality of cameras is in a non-working state, the control circuit 110 may automatically generate target patrol routes of the plurality of cameras except for the specific camera according to all the monitoring regions except for the monitoring region of the specific camera and according to the plurality of target points, to allow the surveillance system to continue monitoring the plurality of target points. Examples of the non-working state may comprise (but are not limited to): an offline state, malfunction state, abnormal image state and covered-lens state. The control circuit 110 may detect the disconnection state, the malfunction state and the abnormal image state (e.g. a camera is out of focus) of the camera through periodically inquiring the operation state of the camera. In addition, the control circuit 110 may perform real-time analysis of image contents in the video data to detect whether the camera is in the covered-lens state due to the lens being covered by a barrier. In another embodiment, the non-working state may further comprise a viewable range error state, and the control circuit 110 may also perform real-time analysis of the image contents in the video data, to detect whether the camera is temporarily disabled due to a specific rotation axis (e.g. a panning rotation axis or a tilting rotation axis) being damaged or the rotation function of a specific rotation axis failing due to being blocked by a barrier, thus making the camera enter the viewable range error state.

According to some embodiments, the control circuit 110 may read data of an electronic map, such as the map data 122MAP, wherein the plurality of cameras are configured in the entity space represented by the electronic map. Further, the control circuit 110 may output the electronic map to a display module 140 of the surveillance system, for displaying the electronic map on the display module 140. Further, the control circuit 110 may refer to at least one user input of the user of the surveillance system to correspondingly label at least one target point within the plurality of target points on the electronic map so the user can confirm the target point. For example, the control circuit 110 may calculate the monitoring regions of the plurality of cameras, respectively, according to the barrier information 124 and the coordinates of the plurality of cameras, in order to generate the space information of the monitoring regions, wherein the barrier information 124 represents at least one barrier in the entity space. More particularly, the control circuit 110 may refer to the user input of the user, to correspondingly label the aforementioned barrier on the electronic map, for the user to confirm the location and the distribution range of the barrier. Further, the control circuit 110 may refer to the location and distribution range of barrier to generate the barrier information.

According to some embodiments, under the control of the control circuit 110, any of the plurality of target points locates on a target patrol route within the target patrol routes, to allow the surveillance system to monitor the plurality of target points.

Figure 3:
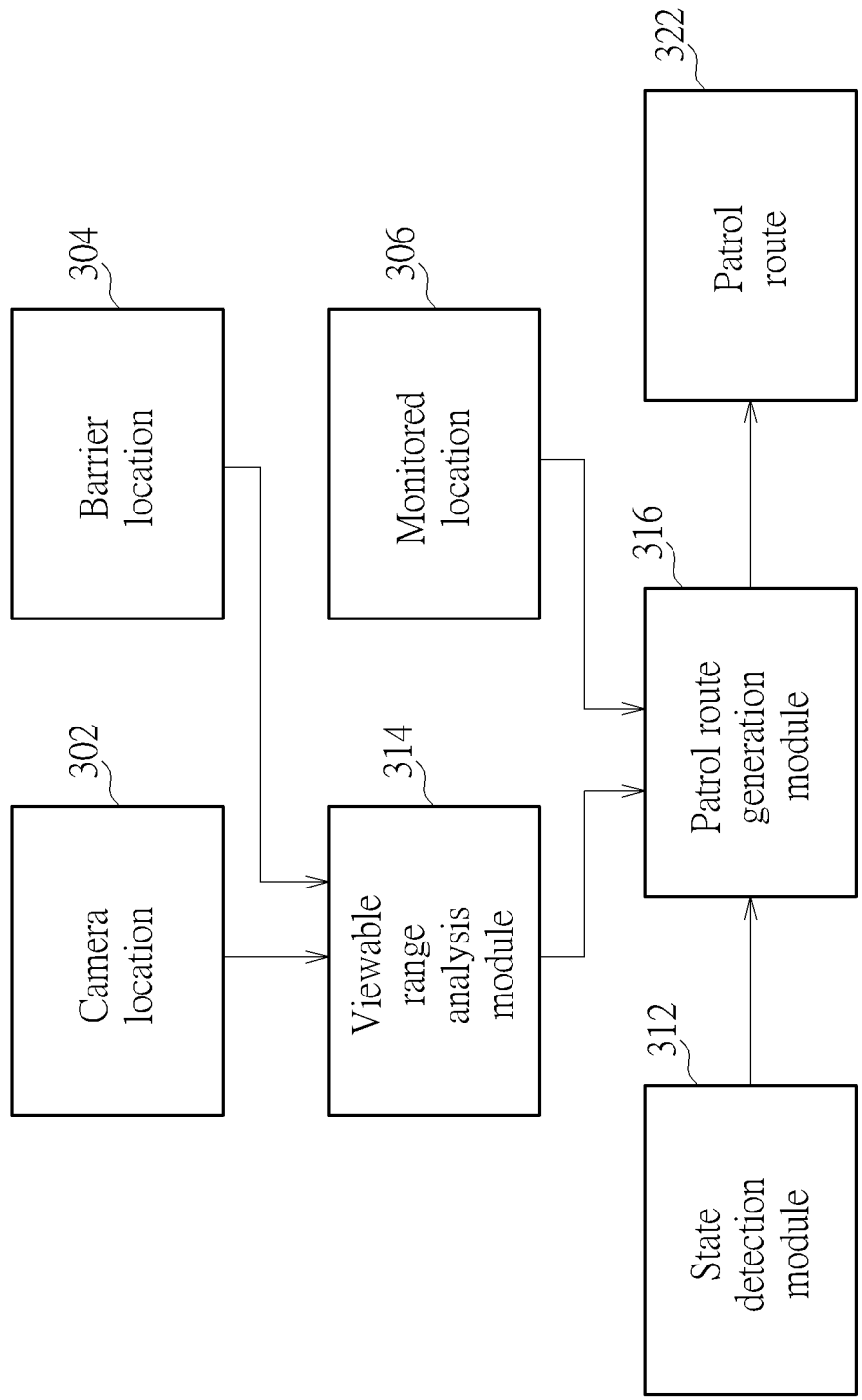
FIG. 3 is a diagram illustrating a control scheme associated with the method shown in FIG. 2.

FIG. 3 is a diagram illustrating a control scheme associated with the method 200 in FIG. 2. The scheme shown in FIG. 3 may be viewed as an intelligent camera patrol route generator. According to this embodiment, the program module 112 may comprise a state detection module 312, a viewable range analysis module 314 and a patrol route generation module 316. The state detection module 312 may detect the states of the plurality of cameras to generate at least one detection result (e.g. one or more detection results), wherein the aforementioned detection result may indicate whether at least one camera (e.g. one or more cameras) within the plurality of cameras is in the non-working state (the disconnection state, the malfunction state, the abnormal image state, and/or the covered-lens state). Further, the viewable range analysis module 314 may refer to the camera location 302 and the barrier location 304 to generate the space information 126, wherein the camera location 302 may be an example of the coordinate data 122CAM, and the barrier location 304 may be an example of the barrier information 124. Further, the patrol route generation module 316 may refer to the aforementioned detection result, the space information 126 and the monitored location 306 to generate the patrol routes 322 of the cameras, wherein the monitored location 306 may represent the locations of the plurality of target points, such as the coordinates of the plurality of target points on the electronic map, and the patrol route 322 of each camera may be an example of the target patrol route information 128.

In practice, the viewable range analysis module 314 may utilize the coordinate of a camera and the rotatable angle of the rotation axis of the camera (e.g. a panning angle range or a tilting angle range), to calculate a global viewable range (i.e., the range which can be captured through capturing direction adjustment) for the camera, to generate information corresponding to the camera in the space information 126. Note that the viewable range may be an example of a specific monitoring region within the monitoring regions. Further, the state detection module 312 may provide the states of all cameras in the present camera group to the viewable range analysis module 314 according to the aforementioned detection result, and may refer to whether there is a change in the camera state for selectively informing the patrol route generation module 316 to regenerate a patrol route. The patrol route generation module 316 may determine a camera to which a target point belongs, and more particularly, determine which target point within the target points should be assigned to a specific camera for patrolling and monitoring, and accordingly generate a target patrol route for each camera. Note that the target point may be a point on the electronic map set by the user, and this point may represent a specific predetermined monitoring region captured by a camera through capturing direction adjustment. For example, when this camera captures the predetermined monitoring region through capturing direction adjustment, the center of the image captured by the camera substantially corresponds to this point on the electronic map. The patrol route generation module 316 may refer to the viewable range of each camera and the coordinate of this target point to determine to add this target point onto patrol routes of specific cameras.

In an example where this target point is used as the specific target point, the patrol route generation module 316 may utilize the predetermined function to calculate the score of the specific target point with respect to the corresponding camera, wherein the predetermined function in this embodiment may be represented as:

$$SCORE=InFOV/(Dist+K*TPC);$$

wherein the symbols "SCORE," "InFOV," "Dist," "TPC" and "K" may represent the score, the overruling parameter, the distance parameter, the target point count parameter and a weighting factor, respectively, and the weighting factor K may be an example of the aforementioned weighting factor. Note that when the distance parameter Dist is smaller (e.g. the target point/the predetermined monitoring area is closer), more details can be monitored by the corresponding camera. When the target point count parameter TPC is larger (e.g. the accumulated amount of the target point/predetermined monitoring area arranged to be monitored by the corresponding camera is larger), the time available for the corresponding camera to monitor a target point/a predetermined monitoring area on the patrol route of the corresponding camera is less.

In this embodiment, the overruling parameter InFOV may be used to represent whether the coordinate of the specific target point locates in the monitoring region of the corresponding camera, For example, if the coordinate of the specific target point locates in the monitoring region of the corresponding camera, InFOV=1; otherwise, InFOV=0. Further, the aforementioned weighting factor, such as the weighting factor K, may be selectively decided according to user settings or default settings. If the user has higher demands on the distance, the user may lower the weighting factor K, whereas if the user cares more about the accumulated amount of target point monitored by the corresponding camera, the user may raise the weighting factor K.

As an example, the coordinate of the specific target point is (1, 2), the coordinate of the corresponding camera is (10, 7), and the accumulated amount of the target point monitored by the corresponding camera has reached 3. If the weighting factor K is 1, the score SCORE will be 0.075. When the score SCORE becomes higher, the probability that the corresponding camera monitors the specific target point becomes higher accordingly.

Further, the user may draw the location of barriers (e.g. pillars), and more particularly, the user may label the sizes of the barriers. Hence, if a barrier exists on the straight line between the coordinate of the corresponding camera and the coordinate of the specific target point, the patrol route generation module 316 may set the overruling parameter InFOV as zero. Examples of the electronic map may comprise (but are not limited to): a normal rectangular coordinate map, a panoramic map, a combination of multiple panoramic maps, a fish-eye diagram, and a combination of multiple fish-eye diagrams. Examples of the aforementioned normal rectangular coordinate map may comprise (but are not limited to) a plane diagram such as a Floor Plane or a Scottish Plane.

According to a modification of this embodiment, the predetermined function may be represented as follows:

SCORE=InFOV/($K1$*Dist+$K2$*TPC);

wherein the symbols "K1" and"K2" are weighting factors, and may be an example of the aforementioned weighting factor.

According to some embodiments, the coordinate of the aforementioned global environment is not limited to be a two-dimensional (2D) coordinate. According to whether the coordinate information provided by the user (e.g. the coordinate of the camera or the coordinate of the target point) comprises vertical coordinate information such as height information, the apparatus 100 may selectively extend associated calculations to a three-dimensional (3D) coordinate system.

Figure 4:
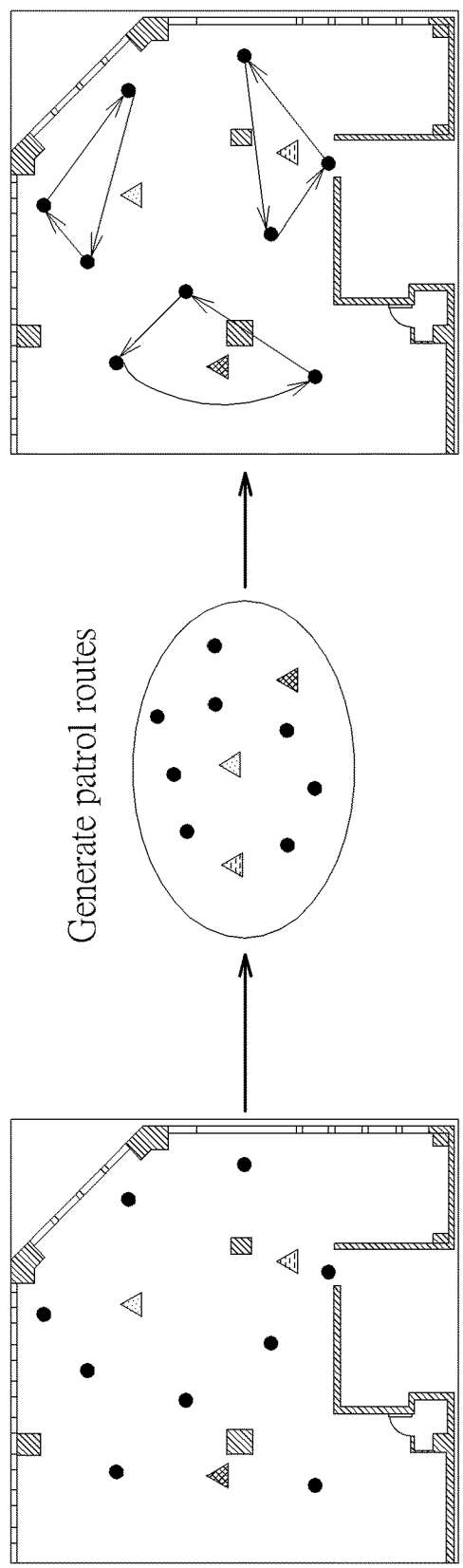
FIG. 4 is a diagram illustrating a patrol route generation scheme associated with the method shown in FIG. 2.

FIG. 4 is a diagram illustrating a patrol route generation scheme associated with the method 200 shown in FIG. 2. The electronic map of the display module 140 is shown in the left part of FIG. 4. The control circuit 110 may utilize triangles to represent locations of the plurality of cameras, and may utilize dots to represent locations of the plurality of target points. According to this embodiment, the apparatus 100 may refer to the monitoring regions of the plurality of cameras and the coordinates of the plurality of target points, to automatically generate a set of patrol routes, as shown on the right part of FIG. 4, wherein any of the plurality of target points locates at a patrol route within the set of patrol routes. Hence, the surveillance system may monitor the plurality of target points.

Figure 5:
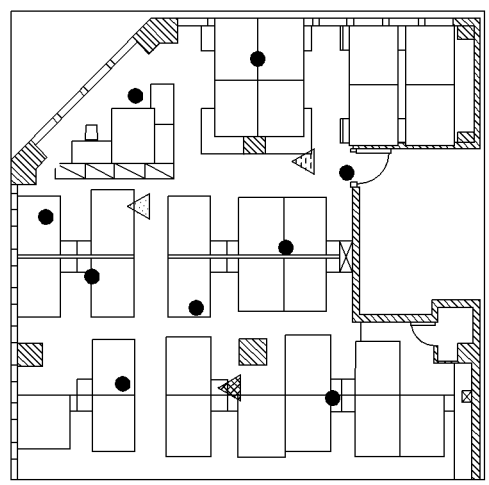
FIG. 5 is a diagram illustrating a target point and camera displaying scheme associated with the method shown in FIG. 2.

FIG. 5 is a diagram illustrating a target point and camera displaying scheme associated with the method 200 shown in FIG. 2, wherein the user interface shown in FIG. 5 corresponds to the left part of FIG. 4. For example, this electronic map may be a plane diagram.

Figure 6:
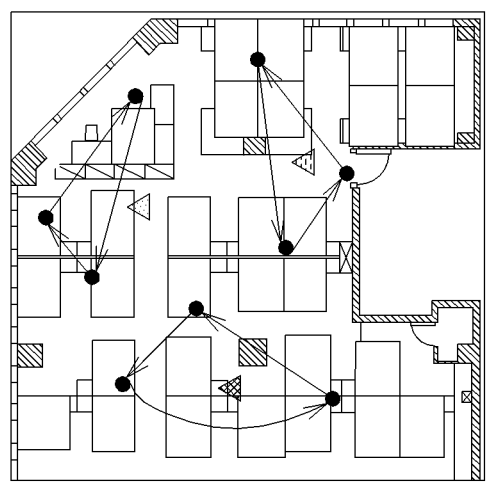
FIG. 6 is a diagram illustrating a target patrol route displaying scheme associated with the method shown in FIG. 2.

FIG. 6 is a diagram illustrating a target patrol route displaying scheme associated with the method 200 shown in FIG. 2, wherein the user interface shown in FIG. 6 corresponds to the right part of FIG. 4. For example, this electronic map may be a plane diagram.

Figure 7:
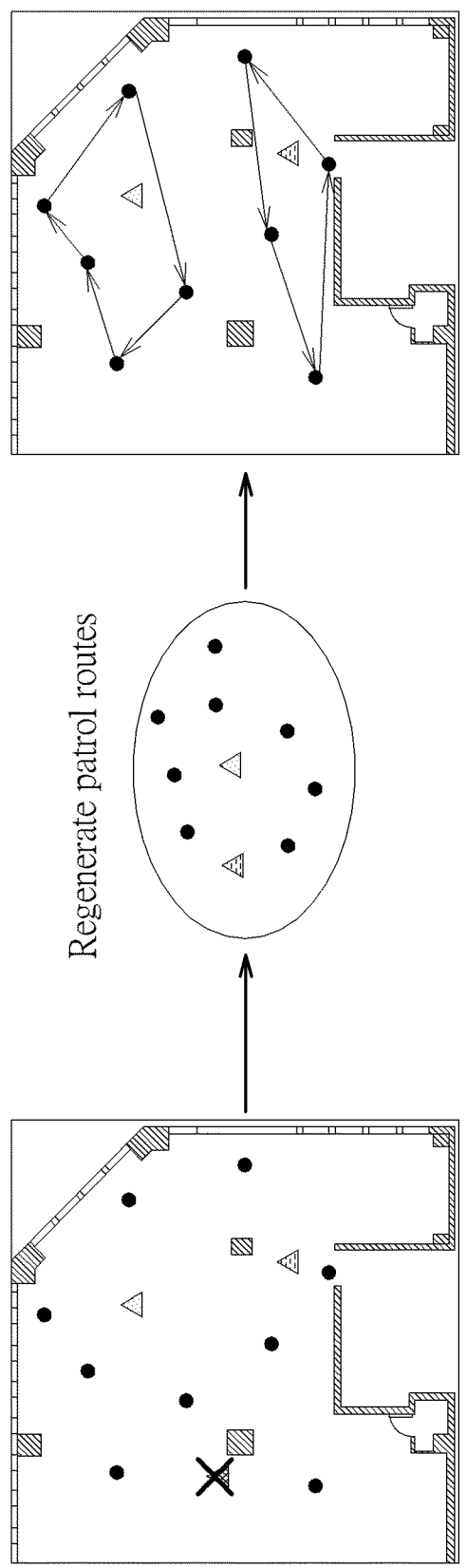
FIG. 7 is a diagram illustrating a patrol route generation scheme associated with the method shown in FIG. 2.

FIG. 7 is a diagram illustrating a patrol route generation scheme associated with the method 200 shown in FIG. 2.

The electronic map of the display module 140 is shown on the left part of FIG. 7. The control circuit 110 may utilize triangles to represent the plurality of cameras, and may utilize spots to represent the plurality of target points. Compared with the embodiment of FIG. 4, the control circuit 110 in this embodiment labels a predetermined symbol "X" on a specific camera within the plurality of cameras, to indicate that the apparatus 100 (or the control circuit 110 therein, and more particularly, the state detection module 312) has detected that this camera is in the non-working state. According to this embodiment, the apparatus 100 may automatically regenerate a set of patrol routes according to all the monitoring regions except for the monitoring region of the camera, as shown on the right part of FIG. 7, wherein any target point within the plurality of target points locates on a patrol route within this set of patrol routes. Hence, the surveillance system may continue monitoring the plurality of target points.

Figure 8:
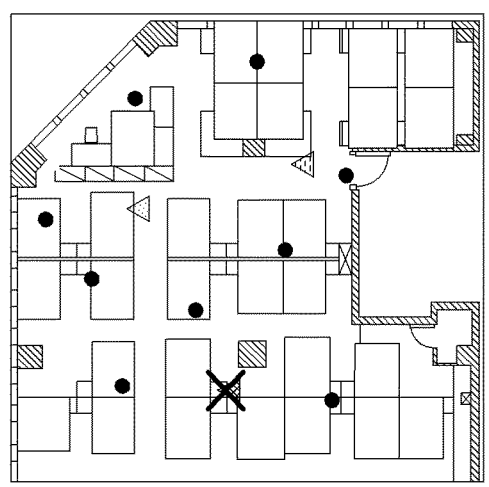
FIG. 8 is a diagram illustrating a target point and camera displaying scheme associated with the method shown in FIG. 2.

FIG. 8 is a diagram illustrating a target point and camera displaying scheme associated with the method 200 shown in FIG. 2, wherein the user interface shown in FIG. 8 corresponds to the left part of FIG. 7. For example, this electronic map may be a plane diagram.

Figure 9:
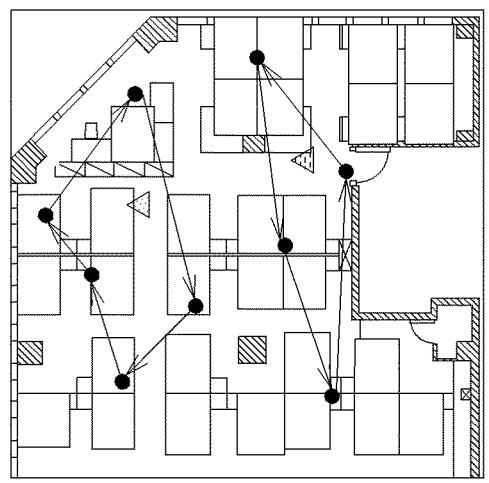
FIG. 9 is a diagram illustrating a target patrol route displaying scheme associated with the method shown in FIG. 2.

FIG. 9 is a diagram illustrating a target patrol route displaying scheme associated with the method 200 shown in FIG. 2, wherein the user interface shown in FIG. 8 corresponds to the right part of FIG. 7. For example, this electronic map may be a plane diagram.

Figure 10:
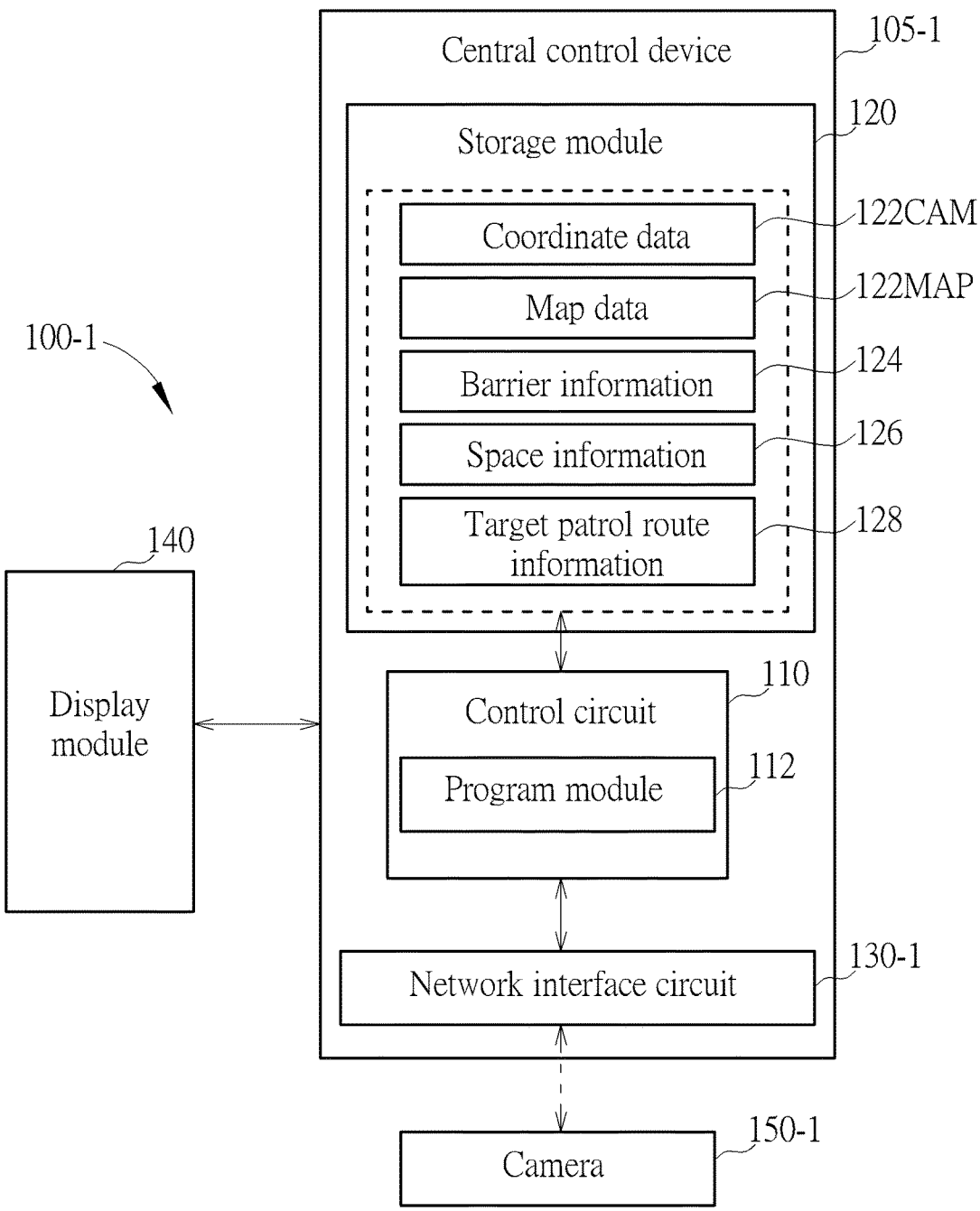
FIG. 10 is a diagram illustrating an apparatus for controlling a surveillance system according to another embodiment of the present invention.

FIG. 10 is a diagram illustrating an apparatus 100-1 for controlling a surveillance system according to another embodiment of the present invention, wherein the method 200 shown in FIG. 2 (along with various modifications of FIG. 2, such as various embodiments/modifications following the embodiment of FIG. 2) may also be applied to the apparatus 100-1 or the central control device 105-1 shown in FIG. 10, and more particularly, the control circuit 110 in the central control device 105-1. Compared with the embodiment shown in FIG. 1, in this embodiment, the interface circuit 130 is replaced with another interface circuit such as the network interface circuit 130-1, and the camera 150 is replaced with the camera 150-1. According to this embodiment, the camera 150-1 may communicate through a network. For example, each of the plurality of cameras (e.g. each of the PTZ cameras) may be an internet protocol (IP) camera. In practice, information can be delivered to the camera 150-1 as long as the camera is connected to a network. Some features in this embodiment similar to those described in previous embodiments/modifications are omitted here for brevity.

Compared with related art techniques, the method and apparatus of the present invention may automatically arrange the plurality of target points on the target patrol routes, to quickly and properly allocate the plurality of target points to the patrol routes. More particularly, the method and apparatus of the present invention may set patrol routes for all cameras in an area in a one-step operation. Hence, the user need not spend time considering which target area should be assigned to a specific camera to patrol and monitor. When any of the cameras is in a disconnected state, the method and apparatus of the present invention may automatically reallocate the patrol routes of those cameras within the camera patrol group which are still operable, in order to reduce the monitoring blank period caused by a disconnection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a surveillance system, the surveillance system comprising a plurality of Pan-Tilt-Zoom (PTZ) cameras equipped with capturing direction adjustment capability, the method applied to a control circuit of the surveillance system, the method comprising:

calculating monitoring regions of the plurality of PTZ cameras according to coordinates of the plurality of PTZ cameras, respectively, to generate space information of the monitoring regions, wherein any monitoring region of the monitoring regions comprises a union of a plurality of regions monitored by a corresponding PTZ camera within the plurality of PTZ cameras through capturing direction adjustment;
automatically generating target patrol routes of the plurality of PTZ cameras according to the monitoring regions and according to a plurality of target points, wherein each target point within the plurality of the target points is generated and labeled on a corresponding position in an electronic map by capturing a predetermined region with a corresponding PTZ camera through capturing direction adjustment; and the step of automatically generating the target patrol routes comprises:
determining whether the corresponding PTZ camera is equipped with capability to capture a specific target point within the plurality of target points according to space information of a monitoring region within the monitoring regions and according to a coordinate of the specific target point, in order to decide a target patrol route of the corresponding PTZ camera; and
applying configurations corresponding to the target patrol routes to the plurality of PTZ cameras, respectively, to make capturing direction adjustment operations of the plurality of PTZ cameras correspond to the target patrol routes, respectively.

2. The method of claim 1, wherein the step of calculating the monitoring regions of the plurality of PTZ cameras according to the coordinates of the plurality of PTZ cameras, respectively, to generate the space information of the monitoring regions comprises:
calculating the monitoring regions of the plurality of PTZ cameras, respectively, according to the coordinates of the plurality of PTZ cameras and rotation ability parameters of at least one PTZ camera within the plurality of PTZ cameras, to generate space information of the monitoring regions.

3. The method of claim 2, wherein the monitoring regions comprise at least one monitoring region corresponding to the PTZ camera; and the monitoring region corresponds to the rotation ability parameters of the PTZ camera.

4. The method of claim 1, wherein the step of
automatically generating the target patrol routes of the plurality of PTZ cameras according to the monitoring regions and according to the plurality of target points further comprises:
when it is determined that the corresponding PTZ camera is not equipped with capability of capturing the specific target point, utilizing another PTZ camera within the plurality of PTZ cameras to monitor the specific target point, wherein the specific target point does not locate on the target patrol route of the corresponding PTZ camera.

5. The method of claim 1, wherein the step of automatically generating the target patrol routes of the plurality of PTZ cameras according to the monitoring regions and according to the plurality of target points further comprises:
during automatically generating the target patrol routes of the plurality of PTZ cameras, controlling a target point amount of the corresponding PTZ camera, to prevent a number of target points monitored by the corresponding PTZ camera from exceeding a predetermined upper bound value.

6. The method of claim 5, wherein the step of automatically generating the target patrol routes of the plurality of PTZ cameras according to the monitoring regions and according to the plurality of target points further comprises:
during automatically generating the target patrol routes of the plurality of PTZ cameras, accumulating the number of target points monitored by the corresponding PTZ camera; and
when the number of target points monitored by the corresponding PTZ camera reaches the predetermined upper bound value, preventing the target patrol route of the corresponding PTZ camera from including any other target point.

7. The method of claim 1, wherein the step of automatically generating the target patrol routes of the plurality of PTZ cameras according to the monitoring regions and according to the plurality of target points further comprises:
during automatically generating the target patrol routes of the plurality of PTZ cameras, calculating a score of the specific target point within the plurality of target points with respect to the corresponding PTZ camera according to a predetermined function; and
deciding whether to utilize the corresponding PTZ camera to monitor the specific target point according to the score of the specific target point within the plurality of target points with respect to the corresponding PTZ camera.

8. The method of claim 7, wherein a probability of the surveillance system utilizing the corresponding PTZ camera to monitor the specific target point depends on a value of the score.

9. The method of claim 7, wherein a plurality of parameters of the predetermined function comprise a target point count parameter, and the target point count parameter represents an accumulated amount of the target point monitored by the corresponding PTZ camera.

10. The method of claim 7, wherein a plurality of parameters of the predetermined function comprise a distance parameter, and the distance parameter represents a distance between the corresponding PTZ camera and the specific target point.

11. The method of claim 10, wherein the plurality of parameters of the predetermined function further comprises a target point count parameter, and the target point count parameter represents an accumulated amount of the target point monitored by the corresponding PTZ camera; the predetermined function comprises at least one weighting factor, and the weighting factor is arranged to adjust an influence of the distance parameter and/or the target point count parameter on the score; and the method further comprises:
providing a user interface, to allow a user of the surveillance system to set the weighting factor for adjusting an influence of the distance and/or the accumulated amount on the score.

12. The method of claim 7, wherein the step of automatically generating the target patrol routes of the plurality of PTZ cameras according to the monitoring regions and according to the plurality of target points further comprises:
during automatically generating the target patrol routes of the plurality of PTZ cameras, calculating a score of the specific target point with respect to another PTZ camera of the plurality of PTZ cameras according to the predetermined function; and
comparing the score of the specific target point with respect to the corresponding PTZ camera with the score of the specific target point with respect to the other PTZ camera, to decide whether to utilize the corresponding PTZ camera to monitor the specific target point.

13. The method of claim 7, wherein a plurality of parameters of the predetermined function comprise an overruling parameter; and the step of automatically generating the target patrol routes of the plurality of PTZ cameras according to the monitoring regions and according to the plurality of target points further comprises:
    determining whether the corresponding PTZ camera is equipped with capability of capturing the specific target point according to space information of the monitoring region within the monitoring regions and according to the coordinate of the specific target point; and
    when it is determined that the corresponding PTZ camera is not equipped with capability of capturing the specific target point, setting the overruling parameter as zero, in order to force the score to be zero and make the specific target point not locate on the target patrol route of the corresponding PTZ camera.

14. The method of claim 1, further comprising:
when it is detected that a PTZ camera of the plurality of PTZ cameras is in a non-working state, automatically generating a target patrol route of a specific PTZ camera within the plurality of PTZ cameras which does not include the PTZ camera in the non-working state, wherein the target patrol route is automatically generated according to a specific monitoring region within the monitoring regions except for a particular monitoring region of the PTZ camera in the non-working state, to allow the surveillance system to continue monitoring all of the plurality of target points.

15. The method of claim 1, further comprising:
reading data of the electronic map, wherein the plurality of PTZ cameras are configured in an entity space represented by the electronic map; and
outputting the electronic map to a display module of the surveillance system, for displaying the electronic map on the display module.

16. The method of claim 15, wherein the step of calculating monitoring regions of the plurality of PTZ cameras according to the coordinates of the plurality of PTZ cameras, respectively, to generate the space information of the monitoring regions further comprises:
    calculating the monitoring regions of the plurality of PTZ cameras according to barrier information and according to the coordinates of the plurality of PTZ cameras, respectively, to generate space information of the monitoring regions, wherein the barrier information represents at least one barrier in the entity space.

17. The method of claim 16, further comprising:
labeling the barrier on the electronic map according to the user input of the user, for the user to confirm a location and a distribution range of the barrier; and
generating the barrier information according to the location and the distribution range of the barrier.

18. The method of claim 1, wherein any of the plurality of target points locates on a target patrol route of the target patrol routes, to allow the surveillance system to monitor all of the plurality of target points.

19. An apparatus for controlling a surveillance system, the surveillance system comprising a plurality of Pan-Tilt-Zoom (PTZ) cameras equipped with capturing direction adjustment, the apparatus comprising at least a portion of the surveillance system, and comprising:
    an interface circuit, configured in a central control device of the surveillance system, and coupled to the plurality of PTZ cameras; and a control circuit, coupled to the interface circuit and configured in the central control device, wherein the central control device is arranged to:
    calculate monitoring regions of the plurality of PTZ cameras according to coordinates of the plurality of PTZ cameras, respectively, to generate space information of the monitoring regions, wherein any monitoring region of the monitoring regions comprises a union of a plurality of regions monitored by a corresponding PTZ camera of the plurality of PTZ cameras through capturing direction adjustment;
    automatically generate target patrol routes of the plurality of PTZ cameras according to the monitoring regions and according to a plurality of target points, wherein each target point within the plurality of the target points is generated and labeled on a corresponding position in an electronic map by capturing a predetermined region with a corresponding PTZ camera through capturing direction adjustment; and
    the step of automatically generating the target patrol routes comprises:
        determining whether the corresponding PTZ camera is equipped with capability to capture a specific target point within the plurality of target points according to space information of a monitoring region within the monitoring regions and according to a coordinate of the specific target point, in order to decide a target patrol route of the corresponding PTZ camera; and
    apply configurations corresponding to the target patrol routes to the plurality of PTZ cameras, respectively, to make capturing direction adjustment operations of the plurality of PTZ cameras correspond to the target patrol routes, respectively.

20. A method for controlling a surveillance system, the surveillance system comprising a plurality of Pan-Tilt-Zoom (PTZ) cameras equipped with capturing direction adjustment capability, the method applied to a control circuit of the surveillance system, the method comprising:
    calculating a monitoring region according to a union of a plurality of regions monitored by a corresponding PTZ camera within the plurality of PTZ cameras through capturing direction adjustment; and
    determining whether a plurality of target points are within the monitoring region monitored by the corresponding PTZ camera, and if it is determined that a portion of the plurality of the target points are within the monitoring region of the corresponding PTZ camera, generating a target patrol route according to the portion of the plurality of the target points;
wherein when it is detected that the corresponding PTZ camera is in a non-working state, determining whether the portion of the plurality of the target points are within other monitoring regions monitored by other PTZ cameras; and if it is determined that the portion of the plurality of the target points are within said other monitoring regions monitored by said other PTZ cameras, generating other target patrol routes for said other PTZ cameras, respectively, to patrol the portion of the plurality of the target points.

* * * * *